(12) United States Patent
Chen et al.

(10) Patent No.: US 9,935,745 B2
(45) Date of Patent: Apr. 3, 2018

(54) SIGNAL SENDING METHOD AND SIGNAL SENDING DEVICE

(71) Applicant: Huawei Technologies Co., Ltd., Shenzhen, Guangdong (CN)

(72) Inventors: Lei Chen, Chengdu (CN); Lei Min, Chengdu (CN); Dan Wu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 14/831,652

(22) Filed: Aug. 20, 2015

(65) Prior Publication Data

US 2015/0358130 A1 Dec. 10, 2015

Related U.S. Application Data

(63) Continuation of application No. PCT/CN2013/088402, filed on Dec. 3, 2013.

(30) Foreign Application Priority Data

Mar. 22, 2013 (CN) .......................... 2013 1 0096328

(51) Int. Cl.
*H04L 25/03* (2006.01)
*H04L 5/00* (2006.01)
(Continued)

(52) U.S. Cl.
CPC ......... *H04L 5/0026* (2013.01); *H04B 7/0413* (2013.01); *H04B 7/0452* (2013.01);
(Continued)

(58) Field of Classification Search
CPC .. H04B 7/0413; H04B 7/0452; H04B 7/0482; H04B 7/068; H04J 11/003; H04L 27/264
(Continued)

(56) References Cited

U.S. PATENT DOCUMENTS

| 7,436,881 B2 | 10/2008 | Nedic et al. |
| 2008/0144733 A1 | 6/2008 | Elgamal et al. |

(Continued)

FOREIGN PATENT DOCUMENTS

| CN | 101507167 A | 8/2009 |
| CN | 102497348 A | 6/2012 |

(Continued)

OTHER PUBLICATIONS

Eleftherios et al., "Adaptive BLAST Decision-Feedback Equalizer for MIMO-FBMC/OQAM Systems," IEEE, 2010, pp. 841-846.*
R. Pantos, Ed., et al., "HTTP Live Streaming", Nov. 19, 2015, 49 pages.
Miquel Payaro, et al., "Performance Comparison between FBMC and OFDM in MIMO Systems under Channel Uncertainty", 2010 European Wireless Conference, Apr. 12, 2010, p. 1023-1030.

(Continued)

*Primary Examiner* — Tesfaldet Bocure (57) ABSTRACT

The present invention provides a signal sending method and a signal sending device, where the signal sending method includes: canceling interference from symbols of a boundary between at least two precoding code blocks in a multiple input multiple output filter bank multicarrier MIMO-FBMC system, where the precoding code block includes at least one time-frequency resource element that uses same precoding; performing precoding on a to-be-sent symbol in the precoding code block to obtain a precoded symbol; and sending the precoded symbol. In the present invention, mutual interference between precoding code blocks at a time-frequency critical location can be completely or partially canceled.

18 Claims, 6 Drawing Sheets

(51) Int. Cl.
  *H04B 7/04* (2017.01)
  *H04J 11/00* (2006.01)
  *H04B 7/0452* (2017.01)
  *H04B 7/0413* (2017.01)
  *H04B 7/06* (2006.01)
  *H04L 27/26* (2006.01)

(52) U.S. Cl.
  CPC ........... *H04B 7/0482* (2013.01); *H04B 7/068* (2013.01); *H04J 11/003* (2013.01); *H04L 27/264* (2013.01)

(58) Field of Classification Search
  USPC ........................................ 375/285, 295, 296
  See application file for complete search history.

(56) References Cited

U.S. PATENT DOCUMENTS

| | | | |
|---|---|---|---|
| 2009/0213949 | A1 | 8/2009 | Javaudin |
| 2012/0243625 | A1 | 9/2012 | Berg |
| 2015/0358130 | A1 | 12/2015 | Chen et al. |
| 2017/0099172 | A1* | 4/2017 | Ren ........................ H04L 27/264 |
| 2017/0142726 | A1* | 5/2017 | Kim ..................... H04B 7/0632 |

FOREIGN PATENT DOCUMENTS

| | | | | |
|---|---|---|---|---|
| CN | 104065461 | A | | 9/2014 |
| EP | 2950478 | A1 | * 12/2015 | ........... H04B 7/0413 |

OTHER PUBLICATIONS

Inaki Estella, et al., "OFDM and FBMC Performance Comparison for Multistream MIMO Systems", Future Network and Mobile Summit 2010 Conference Proceedings, Jun. 16, 2010, 8 pages.

R. Zakaria, et al., "On ISI cancellation in MIMO-ML detection using FBMC/QAM modulation", International Symposium on Wireless Communication Systems, Aug. 28, 2012, p. 949-953.

Rostom Zakaria, et al., "A Novel Filter-Bank Multicarrier Scheme tp Mitigate the Intrinsic Interference: Application to MIMO Systems", IEEE Transactions on Wireless Communications, vol. 11, No. 3, Mar. 2012, p. 1112-1123.

Chrislin Lele, et al., "CDMA Transmission with Complex OFDM/OQAM", EURASIP Journal on Wireless Communications and Networking, vol. 2008, May 15, 2007, 12 pages.

Dinh-Thuy Phan-Huy, et al., "Make-It-Real precoders for MIMO OFDM/OQAM without inter carrier interference", Wireless Communications Symposium, 2013, p. 3920-3924.

Montse Najar, et al., "PHYDYAS—PHYsical layer for DYnamic AccesS and congnitive radio", Jan. 1, 2008, 97 pages.

Ari Viholainen, et al., "PHYDYAS—PHYsical layer for DYnamic AccesS and congnitive radio", Jan. 1, 2008, 102 pages.

Zhong Yuanhong, "Research on Filter Bank Multicarrier System with Wide Sub-band and Its Key Technology", College of Communication Engineering of Chongqing University, Oct. 2011, 120 pages.

* cited by examiner

SIGNAL SENDING METHOD AND SIGNAL SENDING DEVICE

CROSS-REFERENCE TO RELATED APPLICATIONS

This application is a continuation of International Application No. PCT/CN2013/088402, filed on Dec. 3, 2013, which claims priority to Chinese Patent Application No. 201310096328.3, filed on Mar. 22, 2013, both of which are hereby incorporated by reference in their entireties.

TECHNICAL FIELD

The present invention relates to the communications field, and in particular, to a signal sending method and a signal sending device.

BACKGROUND

Filter bank multicarrier (Filter Bank Multi-carrier, FBMC for short) is a multicarrier modulation technology. Compared with orthogonal frequency division multiplexing (Orthogonal Frequency Division Multiplexing, OFDM for short), the FBMC has lower out-of-band radiation and higher spectral efficiency, and has a good application prospect. A typical implementation solution of the FBMC is using an orthogonal frequency division multiplexing (OFDM)/offset quadrature amplitude modulation (Offset Quadrature Amplitude Modulation, OQAM for short) technology. The OFDM/OQAM uses a filter bank, and may implement transmission without inter-symbol interference (Inter-Symbol Interference, ISI for short) in a case in which a cyclic prefix (Cyclic Prefix, CP for short) does not need to be added.

An important characteristic of the FBMC is that there are different levels of mutual interference between adjacent subcarriers and between adjacent FBMC symbols. A sent symbol on any time-frequency resource generates additional received signals at an adjacent time-frequency resource location, thereby causing interference to a wanted received signal. A coefficient of these additional received signals is referred to as a transmultiplexer response (Transmultiplexer Response) or referred to as an impulse response of a transceiving system, or may be referred to as a filter bank interference coefficient. Generally, a range and a level of mutual interference are indicated by listing filter bank interference coefficients. Table 1 provides a typical example of a filter bank interference coefficient table. In Table 1, a row represents a number of a subcarrier, and a column represents a number of an FBMC symbol. An interference coefficient in the table indicates a coefficient of a received symbol generated at a corresponding subcarrier and symbol location around a central location by a symbol sent at the central location (that is, subcarrier 0 and symbol 0) For example, it is assumed that the sent symbol at the central location is $s_0$, and an interference coefficient of a location of subcarrier i and symbol j is $a_{i,j}$; then, $s_0$ generates a received symbol $a_{i,j} \times s_0$ at the location of subcarrier i and symbol j. If processing is not performed, this signal generates interference to receiving of a wanted symbol sent at the location.

TABLE 1

| Sub-carrier | Symbol | | | | | | | | |
|---|---|---|---|---|---|---|---|---|---|
| | −4 | −3 | −2 | −1 | 0 | 1 | 2 | 3 | 4 |
| −1 | 0.0054 | j0.0429 | −0.1250 | −j0.2058 | 0.2393 | j0.2058 | −0.1250 | −j0.0429 | 0.0054 |
| 0 | 0 | −0.0668 | 0.0-002 | 0.5644 | 1 | 0.5644 | 0.0002 | −0.0668 | 0 |
| 1 | 0.0054 | −j0.0429 | −0.1250 | j0.2058 | 0.2393 | −j0.2058 | −0.1250 | j0.0429 | 0.0054 |

In an OFDM/OQAM system, a sent symbol is a pure real number or a pure imaginary number, and is mapped to a time-frequency resource element by using a real-imaginary alternation rule. On this premise, it may be found, according to a characteristic of the interference coefficient table, that interference always occurs in an imaginary part or a real part opposite to the sent symbol. Therefore, if a channel is flat, after channel equalization is performed, interference may be canceled by using a simple operation of separating a real part from an imaginary part.

In a current wireless communications system such as Long Term Evolution (Long Term Evolution, LTE for short), a multiple input multiple output (Multiple Input Multiple Output, MIMO for short) technology is widely applied. The MIMO technology and the OFDM technology may be combined in a relatively natural manner, thereby greatly improving system performance. A precoding technology is a method commonly used in a MIMO-OFDM system. A precoding process may be considered as a process of mapping to-be-sent data to a transmit antenna in a specific manner, and a purpose of the precoding process is to enable, by means of such processing, a terminal to acquire better quality of a received signal.

Similar to the OFDM, the FBMC may also be combined with the MIMO, and a precoding technical solution is similar to that in MIMO-OFDM. However, a combination of the MIMO technology and the FBMC technology also faces some problems, where an important problem is interference between subcarriers and between FBMC symbols as described in the foregoing. In the OFDM/OQAM system, a prerequisite for being capable of perfectly canceling interference between adjacent symbols at a receiver is that the channel is flat. However, for the MIMO-FBMC, because precoding is introduced, the foregoing channel becomes an equivalent channel, that is, a product of a channel and precoding. In the vicinity of a time-frequency boundary between different precoding code blocks, the equivalent channel may be no longer flat, and interference cannot be canceled simply by using the foregoing method for separating a real part from an imaginary part after equalization.

SUMMARY

The present invention provides a signal sending method and a signal sending device, so as to implement that mutual interference between precoding code blocks at a time-frequency critical location is completely canceled.

A first aspect of the present invention provides a signal sending method, including:

canceling interference from symbols of a boundary between at least two precoding code blocks in a multiple input multiple output filter bank multicarrier MIMO-FBMC system, where the precoding code block includes at least one time-frequency resource element that uses same precoding;

performing precoding on a to-be-sent symbol in the precoding code block to obtain a precoded symbol; and sending the precoded symbol.

With reference to the first aspect, in a first possible implementation manner of the first aspect, the symbols of the boundary between the at least two precoding code blocks are determined by a diffusion range that is of an interference coefficient table of a filter bank and in a time domain and a frequency domain, and ranges of the symbols of the boundary between the at least two precoding code blocks each are less than or equal to the diffusion range that is of the interference coefficient table and in the time domain and the frequency domain.

With reference to the first aspect, in a second possible implementation manner of the first aspect, the time-frequency resource element that uses same precoding includes a time-frequency resource element that is processed by a transmit end and has a same coefficient matrix before symbol sending.

With reference to the first aspect, in a third possible implementation manner of the first aspect, the canceling interference from symbols of a boundary between at least two precoding code blocks in a multiple input multiple output filter bank multicarrier MIMO-FBMC system includes:

determining an interference offset, and adding the interference offset to at least one of the symbols of the boundary between the precoding code blocks to obtain the to-be-sent symbol.

With reference to the third possible implementation manner of the first aspect, in a fourth possible implementation manner of the first aspect, the determining an interference offset includes:

determining a precoding code block on which interference exists; and calculating, according to an acquired channel matrix, a precoding matrix used by the precoding code block on which interference exists, an interference coefficient table of a filter bank, and a symbol that generates interference, an interference offset corresponding to the symbols of the boundary between the at least two precoding code blocks.

With reference to the first aspect or any one of the first to the fourth possible implementation manners of the first aspect, in a fifth possible implementation manner of the first aspect, the canceling interference from symbols of a boundary between at least two precoding code blocks in a multiple input multiple output filter bank multicarrier MIMO-FBMC system includes:

constructing a precoding matrix to cancel interference generated by a precoding code block that uses the constructed precoding matrix to another precoding code block.

With reference to the fifth possible implementation manner of the first aspect, in a sixth possible implementation manner of the first aspect, the constructing a precoding matrix to cancel interference generated by a precoding code block that uses the constructed precoding matrix to another precoding code block includes:

constructing the precoding matrix, so that for the $i^{th}$ precoding code block that does not use the constructed precoding matrix, $Im(W_i H_i P)$ is a zero matrix, where P is the constructed precoding matrix, $W_i$ is a balanced matrix that is used by a receiver and of the $i^{th}$ precoding code block that does not use the constructed precoding matrix, $H_i$ indicates a channel matrix of the $i^{th}$ precoding code block that does not use the constructed precoding matrix, and $Im(\cdot)$ indicates performing, on $(\cdot)$, an operation of obtaining an imaginary part of a complex number.

With reference to the fifth or the sixth possible implementation manner of the first aspect, in a seventh possible implementation manner of the first aspect, the performing precoding on a to-be-sent symbol in the precoding code block to obtain a precoded symbol includes:

performing precoding on the to-be-sent symbol in the precoding code block by using the constructed precoding matrix, to obtain the precoded symbol.

With reference to the first aspect or with reference to the first, the second, the third, the fourth, or the sixth possible implementation manner of the first aspect, in an eighth possible implementation manner of the first aspect, the canceling interference from symbols of a boundary between at least two precoding code blocks in a multiple input multiple output filter bank multicarrier MIMO-FBMC system includes:

reserving at least one subcarrier between adjacent precoding code blocks as a guard band, where valid data is not transmitted on the guard band; or reserving at least one symbol between adjacent precoding code blocks as a guard band, where valid data is not transmitted on the guard band; or reserving at least one subcarrier and at least one symbol between adjacent precoding code blocks as a guard band, where valid data is not transmitted on the guard band.

A second aspect of the present invention provides a signal sending device, including:

an interference cancellation module, configured to cancel interference from symbols of a boundary between at least two precoding code blocks in a multiple input multiple output filter bank multicarrier MIMO-FBMC system, where the precoding code block includes at least one time-frequency resource element that uses same precoding;

a signal processing module, configured to: after the interference cancellation module cancels the interference from the symbols of the boundary between the at least two precoding code blocks in the MIMO-FBMC system, perform precoding on a to-be-sent symbol in the precoding code block to obtain a precoded symbol; and a sending module, configured to send the precoded symbol obtained by the signal processing module.

With reference to the second aspect, in a first possible implementation manner of the second aspect, the symbols of the boundary between the at least two precoding code blocks are determined by a diffusion range that is of an interference coefficient table of a filter bank and in a time domain and a frequency domain, and ranges of the symbols of the boundary between the at least two precoding code blocks each are less than or equal to the diffusion range that is of the interference coefficient table and in the time domain and the frequency domain.

With reference to the second aspect, in a second possible implementation manner of the second aspect, the time-frequency resource element that uses same precoding includes a time-frequency resource element that is processed by a transmit end and has a same coefficient matrix before symbol sending.

With reference to the second aspect, in a third possible implementation manner of the second aspect, the interference cancellation module is specifically configured to: determine an interference offset, and add the interference offset to at least one of the symbols of the boundary between the precoding code blocks to obtain the to-be-sent symbol.

With reference to the third possible implementation manner of the second aspect, in a fourth possible implementation manner of the second aspect, the interference cancellation module includes:

a determining submodule, configured to determine a precoding code block on which interference exists; and a calculating submodule, configured to calculate, according to an acquired channel matrix, a precoding matrix used by the precoding code block on which interference exists and that is determined by the determining submodule, an interference coefficient table of a filter bank, and a symbol that generates interference, an interference offset corresponding to the symbols of the boundary between the at least two precoding code blocks.

With reference to the second aspect or any one of the first to the fourth possible implementation manners of the second aspect, in a fifth possible implementation manner of the second aspect, the interference cancellation module is specifically configured to construct a precoding matrix to cancel interference generated by a precoding code block that uses the constructed precoding matrix to another precoding code block.

With reference to the fifth possible implementation manner of the second aspect, in a sixth possible implementation manner of the second aspect, the interference cancellation module is specifically configured to construct the precoding matrix, so that for the $i^{th}$ precoding code block that does not use the constructed precoding matrix, $Im(W_i H_i P)$ is a zero matrix, where P is the constructed precoding matrix, $W_i$ is a balanced matrix that is used by a receiver and of the $i^{th}$ precoding code block that does not use the constructed precoding matrix, $H_i$ indicates a channel matrix of the $i^{th}$ precoding code block that does not use the constructed precoding matrix, and $Im(\cdot)$ indicates performing, on $(\cdot)$, an operation of obtaining an imaginary part of a complex number.

With reference to the fifth or the sixth possible implementation manner of the second aspect, in a seventh possible implementation manner of the second aspect, that the signal processing module is configured to perform precoding on the to-be-sent symbol in the precoding code block to obtain the precoded symbol includes that:

the signal processing module is specifically configured to perform precoding on the to-be-sent symbol in the precoding code block by using the constructed precoding matrix, to obtain the precoded symbol.

With reference to the second aspect or with reference to the first, the second, the third, the fourth, or the sixth possible implementation manner of the second aspect, in an eighth possible implementation manner of the second aspect, the interference cancellation module is specifically configured to: reserve at least one subcarrier between adjacent precoding code blocks as a guard band, where valid data is not transmitted on the guard band; or reserve at least one symbol between adjacent precoding code blocks as a guard band, where valid data is not transmitted on the guard band; or reserve at least one subcarrier and at least one symbol between adjacent precoding code blocks as a guard band, where valid data is not transmitted on the guard band.

The technical effects of the present invention are as follows: In the present invention, first, interference from symbols of a boundary between at least two precoding code blocks in a MIMO-FBMC system is canceled, then precoding is performed on a to-be-sent symbol in the foregoing precoding code block to obtain a precoded symbol, and the foregoing precoded symbol is sent, so that mutual interference between precoding code blocks at a time-frequency critical location can be completely or partially canceled.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

In a multi-user system, a physical resource is generally divided into time-frequency resource blocks of a relatively small granularity. Different time-frequency resource blocks are allocated, according to a specific scheduling rule, to different users for use, which means that different precoding matrices are used on these time-frequency resource blocks allocated to the different users. In addition, in order to obtain a preferable compromise between complexity and performance, precoding is generally performed according to a specific frequency domain granularity. Therefore, different precoding matrices may exist even on a time-frequency resource of a same user. These resource blocks that use different precoding definitely have a critical point of a change in precoding in terms of time and frequency. Interference between precoding code blocks is generated at locations of these critical points, and the following three possibilities may be included:

1. At a critical location in a frequency domain, interference is imposed by a signal of another precoding subband.

2. At a critical location in a time domain, interference is imposed by another timeslot.

3. Interference may be imposed by another precoding data block in both a time domain and a frequency domain.

According to the signal sending method provided in the present invention, at least one type of the foregoing interference may be canceled, and it is implemented that mutual interference between precoding code blocks at a time-frequency critical location is canceled.

Figure 1:
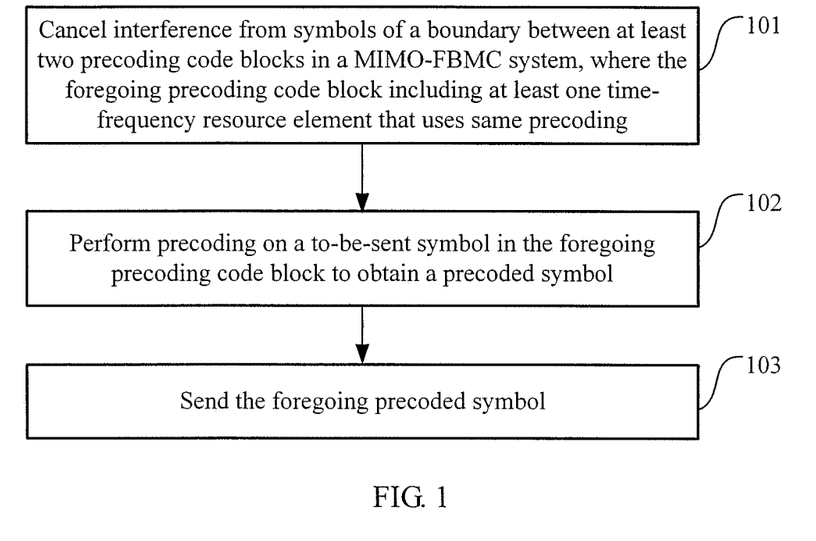
FIG. 1 is a flowchart of an embodiment of a signal sending method according to the present invention.

FIG. 1 is a flowchart of an embodiment of a signal sending method according to the present invention. As shown in FIG. 1, the signal sending method may include the following steps:

Step 101: Eliminate interference from symbols of a boundary between at least two precoding code blocks in a MIMO-FBMC system, where the foregoing precoding code block includes at least one time-frequency resource element that uses same precoding.

The foregoing interference is generated from non-orthogonality of a filter and a change of precoding on a time-frequency resource element.

The symbols of the boundary between the foregoing at least two precoding code blocks are determined by a diffusion range that is of an interference coefficient table of a filter bank and in a time domain and a frequency domain, and ranges of the symbols of the boundary between the foregoing at least two precoding code blocks each are less than or equal to the diffusion range that is of the foregoing interference coefficient table and in the time domain and the frequency domain, where the foregoing symbols of the boundary are symbols in the vicinity of the boundary between the foregoing at least two precoding code blocks.

The foregoing time-frequency resource element that uses same precoding includes a time-frequency resource element that is processed by a transmit end and has a same coefficient matrix before symbol sending.

Step 102: Perform precoding on a to-be-sent symbol in the foregoing precoding code block to obtain a precoded symbol.

Step 103: Send the foregoing precoded symbol.

In the foregoing embodiment, interference from symbols of a boundary between at least two precoding code blocks in a MIMO-FBMC system is canceled, then precoding is performed on a to-be-sent symbol in the foregoing precoding code block to obtain a precoded symbol, and the foregoing precoded symbol is sent, so that mutual interference between precoding code blocks at a time-frequency critical location can be completely or partially canceled.

Figure 2:
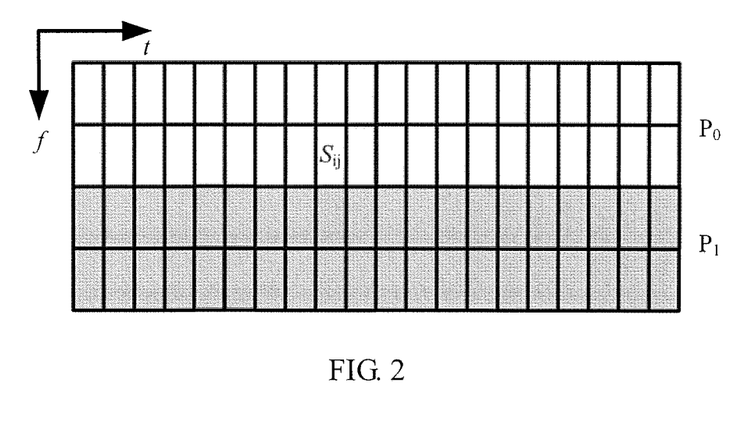
FIG. 2 is a schematic diagram of an embodiment of critical interference of precoding in a frequency domain in a MIMO-FBMC system according to the present invention.
Figure 3:
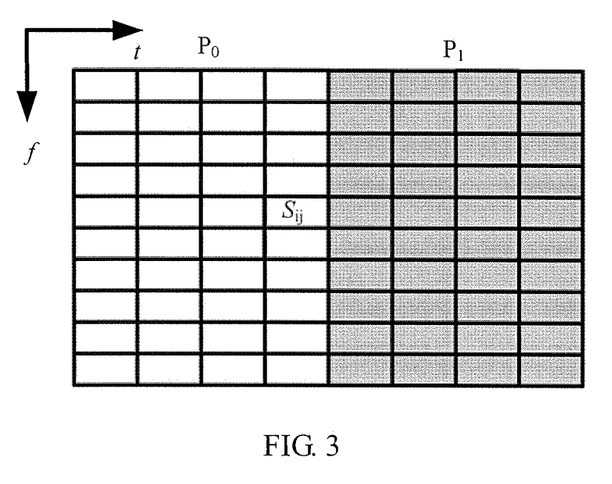
FIG. 3 is a schematic diagram of an embodiment of critical interference of precoding in a time domain in a MIMO-FBMC system according to the present invention.
Figure 4:
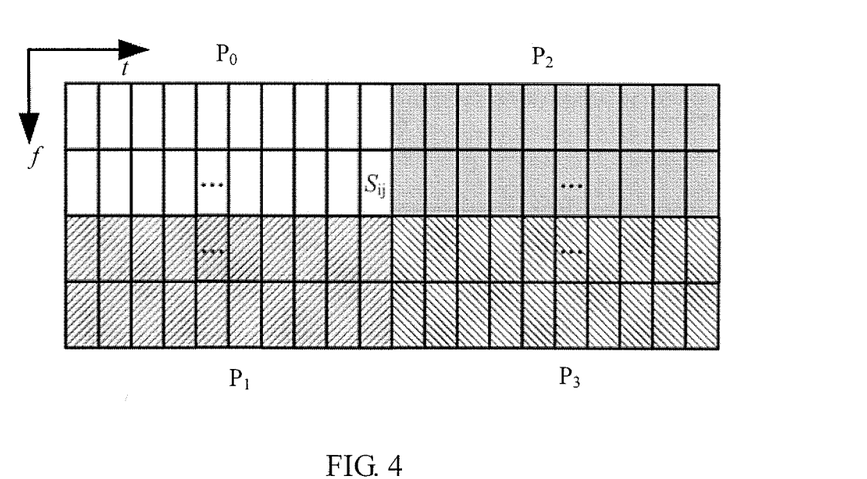
FIG. 4 is a schematic diagram of an embodiment of critical interference of precoding in a time-frequency domain in a MIMO-FBMC system according to the present invention.

In embodiments of the present invention, FIG. 2 is a schematic diagram of an embodiment of critical interference of precoding in a frequency domain in a MIMO-FBMC system according to the present invention, FIG. 3 is a schematic diagram of an embodiment of critical interference of precoding in a time domain in a MIMO-FBMC system according to the present invention, and FIG. 4 is a schematic diagram of an embodiment of critical interference of precoding in a time-frequency domain in a MIMO-FBMC system according to the present invention. Each small block in FIG. 2, FIG. 3, and FIG. 4 represents a time-frequency resource element (Resource Element, RE for short) In an actual system, for precoding code blocks that interfere with each other, in addition to the foregoing several schematic diagrams, there may be more than four schematic diagrams. Generally, it is assumed herein that there are K+1 adjacent precoding code blocks in total, and precoding matrices of the precoding code blocks are respectively $P_0, P_1, \ldots, P_K$. $s_{ij}$ is a to-be-sent symbol in a precoding code block of $P_0$; where i indicates a number of a subcarrier, j indicates a number of an FBMC symbol, and $s_{ij}$ is interfered with by other K precoding code blocks. Then, a model of a received signal may be:

$$x_{ij} = H_{ij}P_0 s_{ij} + \sum_{l,m \in \Theta_0} H_{ij}P_0 \alpha_{lm} s_{lm} + \ldots + \sum_{l,m \in \Theta_K} H_{ij}P_K \alpha_{lm} s_{lm} \quad (1)$$

In formula (1), $s_{ij}$ is a vector of L×1, and L indicates dimensions of data. $H_{ij}$ and $\alpha_{lm}$ are respectively a coefficient in an interference coefficient table of a channel matrix and a filter bank, acquired by a base station. For simplicity, it is assumed herein that channels matrices at different resource locations within a range of the interference coefficient table are the same and are all $H_{ij}$. $\Theta_0$ indicates a location of another data symbol, except $s_{ij}$, that uses the precoding matrix $P_0$ and is in the interference coefficient table, $\Theta_r$ (r=1, 2, ..., k) indicates a location of a data symbol that uses a precoding matrix $P_r$ and is in the interference coefficient table, $s_{lm}$ indicates a symbol that generates interference and whose number is 1 m within a range of $\Theta_0$ or $\Theta_r$, and $\alpha_{lm}$ indicates an interference coefficient of the filter bank at a location at which $s_{lm}$ is located.

It is assumed that a receiver uses zero forcing equalization; then, a balanced matrix is $W_{ij}=[(H_{ij}P_0)^H H_{ij}P_0]^{-1}(H_{ij}P_0)^H$, and a received signal after equalization processing is as follows:

$$\tilde{s}_{ij} = W_{ij}x_{ij} = s_{ij} + \sum_{l,m \in \Theta_0} \alpha_{lm} s_{lm} + W_{ij}H_{ij}P_1 \sum_{l,m \in \Theta_1} \alpha_{lm} s_{lm} + \ldots + \quad (2)$$

$$W_{ij}H_{ij}P_K \sum_{l,m \in \Theta_K} \alpha_{lm} s_{lm}$$

$$= s_{ij} + \sum_{l,m \in \Theta_0} \alpha_{lm} s_{lm} + \text{Re}(W_{ij}H_{ij}P_1) \sum_{l,m \in \Theta_1} \alpha_{lm} s_{lm} +$$

$$\sqrt{-1} \cdot \text{Im}(W_{ij}H_{ij}P_1) \sum_{l,m \in \Theta_1} \alpha_{lm} s_{lm} + \ldots +$$

$$\text{Re}(W_{ij}H_{ij}P_K) \sum_{l,m \in \Theta_K} \alpha_{lm} s_{lm} +$$

$$\sqrt{-1} \cdot \text{Im}(W_{ij}H_{ij}P_K) \sum_{l,m \in \Theta_K} \alpha_{lm} s_{lm}$$

In formula (2), $\sqrt{-1}$ indicates an imaginary unit, and Re(·) and Im(·) respectively indicate performing, on (·), operations of obtaining a real part and an imaginary part of a complex number, which is also applicable to the following. According to a characteristic of FBMC, $\alpha_{lm} s_{lm}$ and $s_{ij}$ have opposite real-imaginary relationships; therefore, all terms of products of $\alpha_{lm} s_{lm}$ and a real number in formula (2) may be canceled after an operation of obtaining a real part or an imaginary part, and no interference is generated to a sent symbol $s_{ij}$. On the contrary, a term of multiplying $\alpha_{lm} s_{lm}$ by an imaginary number generates interference to $s_{ij}$. After an operation of obtaining a real part or an imaginary part is performed on formula (2), the following may be obtained:

$$\tilde{s}_{ij} = s_{ij} + \sqrt{-1} \cdot \text{Im}(W_{ij}H_{ij}P_1) \sum_{l,m \in \Theta_1} \alpha_{lm} s_{lm} + \quad (3)$$

$$\ldots + \sqrt{-1} \cdot \text{Im}(W_{ij}H_{ij}P_K) \sum_{l,m \in \Theta_K} \alpha_{lm} s_{lm}$$

In formula (3), several terms following $s_{ij}$ are interference between precoding code blocks.

In an implementation manner of the embodiment shown in FIG. 1 of the present invention, for formula (3), interference pre-cancellation is performed on a to-be-sent symbol at a precoding critical location to cancel mutual interference between precoding code blocks at a time-frequency critical location. In this case, step 101 may be: determining an interference offset, and adding the foregoing interference offset to at least one of the symbols of the boundary between the foregoing precoding code blocks to obtain the to-be-sent symbol. The foregoing interference offset enables interference that is in the received signal and from the symbols in the vicinity of the boundary between the foregoing at least two precoding code blocks to be 0 or to be close to 0. Specifically, the determining an interference offset may be: determining a precoding code block on which interference exists; and calculating, according to an acquired channel matrix, a precoding matrix used by the foregoing precoding code block on which interference exists, an interference coefficient table of a filter bank, and a symbol that generates interference, an interference offset corresponding to the symbols of the boundary between the foregoing at least two precoding code blocks. The foregoing interference offset enables interference that is in the received signal and from the symbols in the vicinity of the boundary between the at least two precoding code blocks to be 0 or to be close to 0.

It may be seen that a basic idea of the interference pre-cancellation is adding an interference offset $\Delta s_{ij}$ to each to-be-sent symbol $s_{ij}$ in an area of mutual interference, so that mutual interference is changed to 0. After the interference offset $\Delta s_{ij}$ is added to each to-be-sent symbol $s_{ij}$ in the area of mutual interference, formula (3) is changed to:

$$\tilde{s}'_{ij} = s_{ij} + \Delta s_{ij} + \sqrt{-1} \cdot \mathrm{Im}(W_{ij}H_{ij}P_1) \sum_{l,m \in \Theta_1} \alpha_{lm}(s_{lm} + \Delta s_{lm}) + \quad (4)$$

$$\ldots + \sqrt{-1} \cdot \mathrm{Im}(W_{ij}H_{ij}P_K) \sum_{l,m \in \Theta_K} \alpha_{lm}(s_{lm} + \Delta s_{lm}),$$

where:

$\Delta s_{lm}$ is an interference offset at a location at which $s_{lm}$ is located. In order to enable the received signal to exclude precoding interference, a sum of other terms except $s_{ij}$ in formula (4) must be 0. That is, $$\Delta s_{ij} + \sqrt{-1} \cdot \sum_{k \in \Psi} \left[ \mathrm{Im}(W_{ij}H_{ij}P_k) \sum_{l,m \in \Theta_k} \alpha_{lm}(s_{lm} + \Delta s_{lm}) \right] = 0, \quad (5)$$

where:

$\Psi$ indicates a set of precoding code blocks that generate interference to $s_{ij}$, $P_k$ indicates a precoding matrix used by the $k^{th}$ precoding code block on which interference exists, and $\Theta_k$ indicates a set of numbers of symbols in the $k_{th}$ precoding code block on which interference exists. It may be seen that the interference offset $\Delta s_{ij}$ and $\Delta s_{lm}$ are associated with each other; therefore, a simultaneous solution to equations of $\Delta s_{ij}$ that are associated with each other needs to be found. A range of the simultaneous solution is determined according to a form of an interference table, a range of mutual interference between precoding code blocks, and pre-cancellation precision. After the interference offset is obtained, the interference offset is added to a to-be-sent symbol, and then a precoding operation is performed. In addition, a real-imaginary rule of the interference offset is consistent with an interference amount, that is, consistent with an interfered sent symbol; therefore, a real-imaginary rule of a to-be-sent symbol remains unchanged, and therefore no extra interference is generated to a symbol in the precoding code block.

In addition, for simplicity, $\sqrt{-1} \cdot \mathrm{Im}(W_{ij}H_{ij}P_k)$ in formula (5) may be marked as $U_{ij}^k$, to obtain an interference pre-cancellation equation of $s_{ij}$:

$$\Delta s_{ij} + \sum_{k \in \Psi} U_{ij}^k \sum_{l,m \in \Theta_k} \alpha_{lm}(s_{lm} + \Delta s_{lm}) = 0, \quad (7)$$

which is written in a matrix form as follows:

$$\Delta S + \sum_{k \in \Psi} V^k(S^k + \Delta S^k) = 0 \quad (8)$$

In formula (8), $V^k$ indicates a matrix including coefficients of $(s_{lm} + \Delta s_{lm})$ in a precoding code block of $P_k$, each element in the matrix is a product of $U_{ij}^k$ and $\alpha_{lm}$, $S^k$ indicates a vector including a symbol that generates interference in the precoding code block of $P_k$, and $\Delta S$ and $\Delta S^k$ respectively indicate vectors including $\Delta s_{ij}$ and $\Delta s_{lm}$. The equation set shown in formula (8) may be solved by using a simultaneous method or an iterative method. Downlink channel status information used in the foregoing implementation manner may be obtained by performing measurement by means of uplink channel estimation according to reciprocity of an uplink channel and a downlink channel, or by means of feedback by user equipment (User Equipment, UE for short).

In another implementation manner of the embodiment shown in FIG. 1 of the present invention, an interference term in FIG. 3 includes a coefficient matrix $\mathrm{Im}(W_{ij}H_{ij}P_k)$, $k=1, 2, \ldots, K$; therefore step 101 may also be constructing a precoding matrix to cancel interference generated by a precoding code block that uses the constructed precoding matrix to another precoding code block.

That is, the precoding matrix is constructed, so that for a precoding code block that does not use the constructed precoding matrix, $\mathrm{Im}(W_{ij}H_{ij}P_k)$, $k=1, 2, \ldots, K$ is a zero matrix, that is:

$$\mathrm{Im}(W_{ij}H_{ij}P_k) = O_{L_0 \times L_k}, k=1,2,\ldots,K \quad (10),$$

where:

$O_{L_0 \times L_k}$ indicates a zero matrix in $L_0 \times L_k$ dimensions, and $L_0$, $L_k$ respectively indicate dimensions of data transmitted on of the $0^{th}$ and the $k^{th}$ precoding code blocks.

In formula (10), $P_k$ is the constructed precoding matrix, $W_{ij}$ is a balanced matrix that is used by a receiver and corresponding to a sent symbol $s_{ij}$ in the $0^{th}$ precoding code block that does not use the foregoing constructed precoding matrix, $H_{ij}$ indicates a channel matrix corresponding to the sent symbol $s_{ij}$ in the $0^{th}$ precoding code block that does not use the foregoing constructed precoding matrix, and $\mathrm{Im}(\cdot)$ indicates performing, on $(\cdot)$, an operation of obtaining an imaginary part of a complex number.

In this case, step 102 may be performing precoding on the to-be-sent symbol in the foregoing precoding code block by using the foregoing constructed precoding matrix, to obtain the precoded symbol.

It is assumed that a receiver uses zero forcing equalization; then, a balanced matrix is as follows:

$$W_{ij} = [(H_{ij}P_0)^H H_{ij}P_0]^{-1}(H_{ij}P_0)^H \quad (11)$$

If $v_i$ is a right singular vector of a matrix, $v_i e^{\sqrt{-1}\cdot\theta}$ is a right singular vector corresponding to a same singular value. Therefore, a possible method for constructing $P_k$ (k=0, 1, 2, ..., K) is as follows: It is assumed that $F_k = [v_1^k \; v_2^k \; ... \; v_{L_k}^k]$ is a precoding matrix constructed by using a conventional method; then, the constructed precoding matrix $P_k$ (k=0, 1, 2, ..., K) may be as follows:

$$P_k = \left[ v_1^k e^{\sqrt{-1}\cdot\theta_1^k} \; v_2^k e^{\sqrt{-1}\cdot\theta_2^k} \; ... \; v_{L_k}^k e^{\sqrt{-1}\cdot\theta_{L_k}^k} \right] = \quad (12)$$

$$F_k \mathrm{diag}\left(e^{\sqrt{-1}\cdot\theta_1^k}, ..., e^{\sqrt{-1}\cdot\theta_{L_k}^k}\right) = F_k \Lambda_k,$$

$$k = 0, 1, ..., K$$

In formula (12), $\Lambda_k = \mathrm{diag}(e^{\sqrt{-1}\cdot\theta_1^k}, ..., e^{\sqrt{-1}\cdot\theta_{L_k}^k})$, where diag indicates a diagonal matrix.

Formula (12) is substituted into formula (11), formula (11) is substituted into formula (10), and the following may be obtained:

$$\mathrm{Im}\{\Lambda_0^{-1}[(H_{ij}F_0)^H H_{ij}F_0]^{-1}(H_{ij}F_0)^H H_{ij}F_k\Lambda_k\} = O_{L_0 \times L_k},$$
$$k=1,2,...,K \quad (13)$$

It is marked that $[(H_{ij}F_0)^H H_{ij}F_0]^{-1}(H_{ij}F_0)^H H_{ij}F_k = A_k$, and an element in the $m^{th}$ row and the $n^{th}$ column is $\alpha_{mn}$; then, formula (13) is equivalent to:

$$\mathrm{Im} \quad (14)$$

$$\left\{ \begin{matrix} \alpha_{11}e^{\sqrt{-1}(\theta_1^k-\theta_1^0)} & \alpha_{12}e^{\sqrt{-1}(\theta_2^k-\theta_1^0)} & ... & \alpha_{1L_k}e^{\sqrt{-1}(\theta_{L_k}^k-\theta_1^0)} \\ \alpha_{21}e^{\sqrt{-1}(\theta_1^k-\theta_2^0)} & \alpha_{22}e^{\sqrt{-1}(\theta_2^k-\theta_2^0)} & ... & \alpha_{2L_k}e^{\sqrt{-1}(\theta_{L_k}^k-\theta_2^0)} \\ \vdots & \vdots & \ddots & \vdots \\ \alpha_{L_0 1}e^{\sqrt{-1}(\theta_1^k-\theta_{L_0}^0)} & \alpha_{L_0 2}e^{\sqrt{-1}(\theta_2^k-\theta_{L_0}^0)} & ... & \alpha_{L_0 L_k}e^{\sqrt{-1}(\theta_{L_k}^k-\theta_{L_0}^0)} \end{matrix} \right\} =$$

$$O_{L_0 \times L_k}, k = 1, 2, ..., K$$

An argument of $\alpha_{mn}$ is marked as $\varphi_{mn}$; then, formula (14) is equivalent to a linear equation set:

$$\begin{bmatrix} \theta_1^k - \theta_1^0 + \varphi_{11} & \theta_2^k - \theta_1^0 + \varphi_{12} & ... & \theta_{L_k}^k - \theta_1^0 + \varphi_{1L_k} \\ \theta_1^k - \theta_2^0 + \varphi_{21} & \theta_2^k - \theta_2^0 + \varphi_{22} & ... & \theta_{L_k}^k - \theta_2^0 + \varphi_{2L_k} \\ \vdots & \vdots & \ddots & \vdots \\ \theta_1^k - \theta_{L_0}^0 + \varphi_{L_0 1} & \theta_2^k - \theta_{L_0}^0 + \varphi_{L_0 2} & ... & \theta_{L_k}^k - \theta_{L_0}^0 + \varphi_{L_0 L_k} \end{bmatrix} = \quad (15)$$

$$O_{L_0 \times L_k}, k = 1, 2, ..., K$$

Apparently, formula (15) is a linear equation set about a group of unknown numbers $\{\theta_l^k, l=1, ..., L_k, k=0, ..., K\}$ (a total of $$\sum_{k=1}^{K} L_k$$

unknown numbers). The linear equation set is obtained in a case that canceling an amount of interference from the precoding code block whose precoding matrix is $P_0$ is considered. In practice, canceling interference from another code block further needs to be considered. In this way, each code block is corresponding to a linear equation set similar to formula (15). All these linear equation sets are combined to obtain a to-be-solved linear equation set, and a solution to the equation set may be found by using a common method for solving a linear equation set. Therefore, interference between different precoding code blocks is canceled completely or to a specific extent.

The foregoing manner for constructing $P_k$ (k=0, 1, 2, ..., K) is only one of possible solutions, and the present invention is not limited thereto. The present invention imposes no limitation on a manner of constructing $P_k$.

Because FBMC uses a prototype filter with a good time-frequency localization effect, a diffusion range of an interference amount is limited. In still another implementation manner of the embodiment shown in FIG. 1 of the present invention, a method for reserving a guard band around each precoding code block is used to cancel interference between precoding code blocks. In this case, step 101 may be: reserving at least one subcarrier between adjacent precoding code blocks as a guard band, where valid data is not transmitted on the guard band; or reserving at least one symbol between adjacent precoding code blocks as a guard band, where valid data is not transmitted on the guard band; or reserving at least one subcarrier and at least one symbol between adjacent precoding code blocks as a guard band, where valid data is not transmitted on the guard band.

Figure 5:
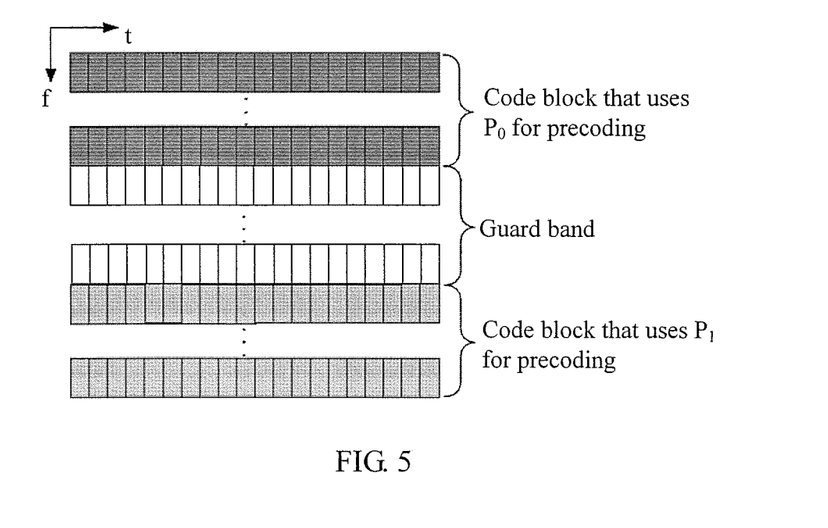
FIG. 5 is a schematic diagram of an embodiment of a frequency domain guard band according to the present invention.

Specifically, in this implementation manner, possible methods for setting a guard band include but are not limited to the following three types:

(1) Eliminating interference in the frequency domain: Several subcarriers between different precoding code blocks are reserved as a guard band, where valid data is not transmitted on the guard band, and instead, data 0 is sent on the guard band. As shown in FIG. 5, FIG. 5 is a schematic diagram of an embodiment of a frequency domain guard band according to the present invention. In FIG. 5, each block indicates a resource element, a horizontal axis t indicates a time axis, and a vertical axis f indicates a frequency axis. It may be seen from FIG. 5 that valid data is not transmitted on several subcarriers between a code block that occupies a frequency band and uses $P_0$ for precoding and a code block that occupies another frequency band and uses $P_1$ for precoding; instead, data 0 is sent on the several subcarriers, and the several subcarriers are used as a guard band.

Figure 6:
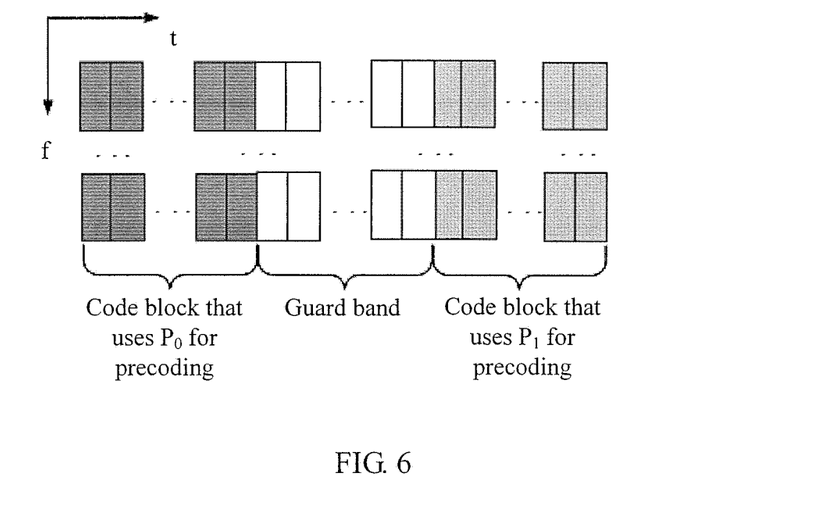
FIG. 6 is a schematic diagram of an embodiment of a time domain guard band according to the present invention.

(2) Eliminating interference in the time domain: Several symbols between different precoding code blocks are reserved as a guard band, where valid data is not transmitted on the guard band, and instead, data 0 is sent on the guard band. As shown in FIG. 6, FIG. 6 is a schematic diagram of an embodiment of a time domain guard band according to the present invention. In FIG. 6, valid data is not transmitted on several symbols between a code block that occupies a time period and uses P0 for precoding and a code block that occupies another time period and uses P1 for precoding; instead, data 0 is sent on the several symbols, and the several symbols are used as a guard band.

Figure 7:
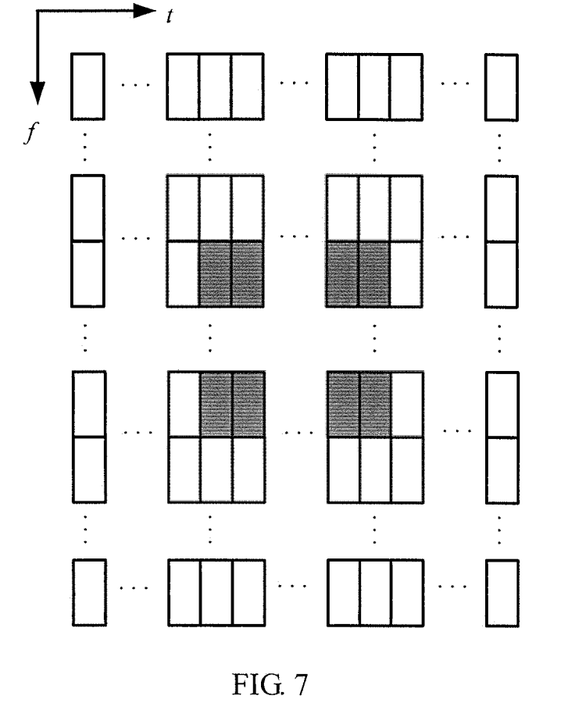
FIG. 7 is a schematic diagram of an embodiment of a time-frequency domain guard band according to the present invention.

(3) Eliminating interference in the time-frequency domain: Several symbols and several subcarriers around a precoding code block are reserved as a guard band, where valid data is not transmitted on the guard band, and instead, data 0 is sent on the guard band. As shown in FIG. 7, FIG. 7 is a schematic diagram of an embodiment of a time-frequency domain guard band according to the present invention. In FIG. 7, a shaded block indicates a code block that occupies a time-frequency resource section and uses P0 for precoding. Blank blocks around the shaded blocks indicates a guard band, where valid data is not transmitted on the guard band, and instead, data 0 is sent on the guard band, so that the shaded blocks are separated from another precoding code block around the shaded blocks. Therefore, there is no mutual interference between a sent data symbol on the shaded blocks and a sent data symbol on the precoding code block around the shaded blocks.

The foregoing three implementation manners of the embodiment shown in FIG. 1 of the present invention may be used separately or may be used in combination. For example, first, a guard band may be reserved in the frequency domain to cancel mutual interference between adjacent precoding code blocks in the frequency domain, and then partial mutual interference between adjacent precoding code blocks in the time domain is canceled by using a method for constructing a precoding matrix. If time-domain interference cannot be completely canceled, residual interference may further be canceled by using an interference pre-cancellation method.

In the present invention, interference that is between precoding code blocks and from a received signal is completely or partially canceled by performing interference pre-cancellation on a sent symbol in a MIMO-FBMC system, or by designing a precoding matrix to implement that a coefficient matrix of an interference amount is a zero matrix, or by using a method for reserving a guard band around a precoding code block.

A person of ordinary skill in the art may understand that all or some of the steps of the method embodiments may be implemented by program instructing relevant hardware. The foregoing program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 8:
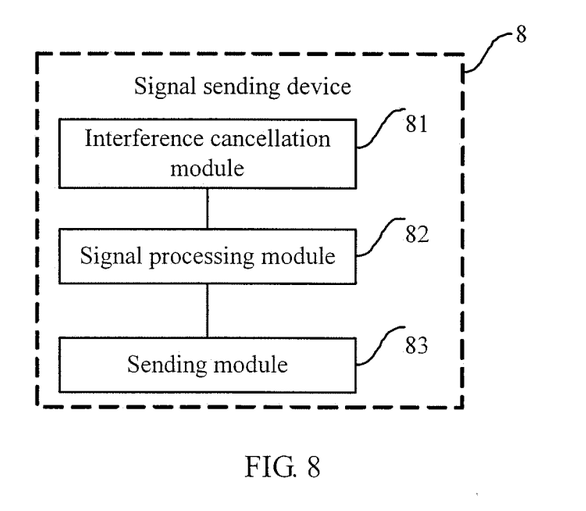
FIG. 8 is a schematic structural diagram of an embodiment of a signal sending device according to the present invention.

FIG. 8 is a schematic structural diagram of an embodiment of a signal sending device according to the present invention. The signal sending device 8 in this embodiment may implement the method provided in the embodiment shown in FIG. 1 of the present invention. As shown in FIG. 8, the signal sending device 8 may include an interference cancellation module 81, a signal processing module 82, and a sending module 83.

The interference cancellation module 81 is configured to cancel interference from symbols of a boundary between at least two precoding code blocks in a MIMO-FBMC system, where the foregoing precoding code block includes at least one time-frequency resource element that uses same precoding, and the foregoing interference is generated from non-orthogonality of a filter and a change of precoding on a time-frequency resource element.

The symbols of the boundary between the foregoing at least two precoding code blocks are determined by a diffusion range that is of an interference coefficient table of a filter bank and in a time domain and a frequency domain, and ranges of the symbols of the boundary between the foregoing at least two precoding code blocks each are less than or equal to the diffusion range that is of the foregoing interference coefficient table and in the time domain and the frequency domain, where the foregoing symbols of the boundary are symbols in the vicinity of the boundary between the foregoing at least two precoding code blocks.

The foregoing time-frequency resource element that uses same precoding includes a time-frequency resource element that is processed by a transmit end and has a same coefficient matrix before symbol sending.

The signal processing module 82 is configured to: after the interference cancellation module 81 cancels the interference from the symbols of the boundary between the at least two precoding code blocks in the MIMO-FBMC system, perform precoding on a to-be-sent symbol in the foregoing precoding code block to obtain a precoded symbol.

The sending module 83 is configured to send the precoded symbol obtained by the signal processing module 82.

In this embodiment, the foregoing signal sending device 8 may be a device that has a signal sending function, such as a base station, a relay (Relay), an access point (Access Point, AP for short), or a UE. This embodiment imposes no limitation on a form of the signal sending device 8.

In the foregoing embodiment, first, an interference cancellation module 81 cancels interference from symbols of a boundary between at least two precoding code blocks in a MIMO-FBMC system, then a signal processing module 82 performs precoding on a to-be-sent symbol in the foregoing precoding code block to obtain a precoded symbol, and then a sending module 83 sends the foregoing precoded symbol, so that mutual interference between precoding code blocks at a time-frequency critical location can be completely or partially canceled.

Figure 9:
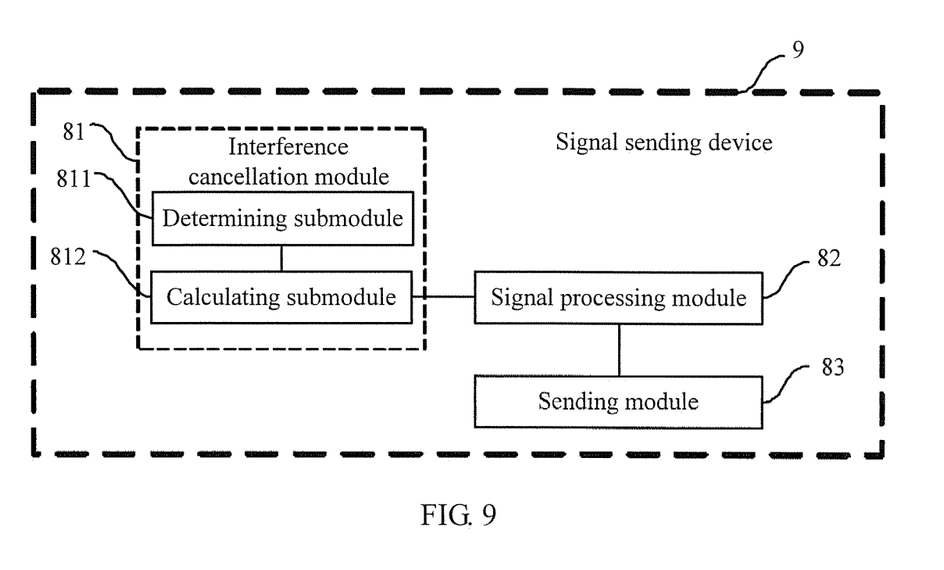
FIG. 9 is a schematic structural diagram of another embodiment of a signal sending device according to the present invention.

FIG. 9 is a schematic structural diagram of another embodiment of a signal sending device according to the present invention. Compared with the signal sending device 8 shown in FIG. 8, a difference lies in that: in an implementation manner of the signal sending device 9 shown in FIG. 9, the interference cancellation module 81 is specifically configured to: determine an interference offset, and add the interference offset to at least one of the foregoing symbols of the boundary between the foregoing precoding code blocks to obtain the to-be-sent symbol, where the foregoing interference offset enables interference that is in a received signal and from the symbols in the vicinity of the boundary between the foregoing at least two precoding code blocks to be 0 or to be close 0.

In this implementation manner, the interference cancellation module 81 may include a determining submodule 811 and a calculating submodule 812.

The determining submodule 811 is configured to determine a precoding code block on which interference exists.

The calculating submodule 812 is configured to calculate, according to an acquired channel matrix, a precoding matrix used by the precoding code block on which interference exists and that is determined by the determining submodule 811, an interference coefficient table of a filter bank, and a symbol that generates interference, an interference offset corresponding to the symbols of the boundary between the at least two precoding code blocks, where the foregoing interference offset enables interference that is in a received signal and from the symbols in the vicinity of the boundary between the foregoing at least two precoding code blocks to be 0 or to be close to 0.

Specifically, the calculating submodule 812 is specifically configured to find, according to the following formula, a solution to a simultaneous equation set obtained by using all possible values of ij:

$$\Delta s_{ij} + \sqrt{-1} \cdot \sum_{k \in \Psi} \left[ \text{Im}(W_{ij} H_{ij} P_k) \sum_{l,m \in \Theta_k} \alpha_{lm}(s_{lm} + \Delta s_{lm}) \right] = 0, \, ij \in \Omega;$$

where:

$\Omega$ indicates a set of numbers of all interfered symbols in the vicinity of the boundary, $\Delta s_{ij}$ indicates an interference offset corresponding to an interfered symbol $s_{ij}$ whose number is ij, $H_{ij}$ indicates a channel matrix corresponding to $s_{ij}$, $\Psi$ indicates a set of precoding code blocks that generate interference to $s_{ij}$, $P_k$ indicates a precoding matrix used by the $k^{th}$ precoding code block on which interference exists, $W_{ij}$ indicates a balanced matrix that is used by a receiver and corresponding to $s_{ij}$, $\Theta_k$ indicates a set of numbers of symbols in the $k^{th}$ precoding code block on which interference exists, $s_{lm}$ indicates a symbol that generates interference and whose number within a range of $\Theta_k$ is lm, $\alpha_{lm}$ indicates an interference coefficient of the filter bank at a location at which $s_{lm}$ is located, $\Delta s_{lm}$ is an interference offset at the location at which $s_{lm}$ is located, and $\text{Im}(\cdot)$ indicates performing, on $(\cdot)$, an operation of obtaining an imaginary part of a complex number.

In another implementation manner of this embodiment, the interference cancellation module 81 is specifically configured to construct a precoding matrix to cancel interference generated by a precoding code block that uses the constructed precoding matrix to another precoding code block. Specifically, the interference cancellation module 81 is specifically configured to construct the precoding matrix, so that for the $i^{th}$ precoding code block that does not use the constructed precoding matrix, $\text{Im}(W_i H_i P)$ is a zero matrix.

P is the foregoing constructed precoding matrix, $W_i$ is a balanced matrix that is used by a receiver and of the $i^{th}$ precoding code block that does not use the constructed precoding matrix, $H_i$ indicates a channel matrix of the $i^{th}$ precoding code block that does not use the constructed precoding matrix, and $\text{Im}(\cdot)$ indicates performing, on $(\cdot)$, an operation of obtaining an imaginary part of a complex number.

In this implementation manner, that the signal processing module 82 is configured to perform precoding on the to-be-sent symbol in the foregoing precoding code block to obtain the precoded symbol may be that the signal processing module 82 is specifically configured to perform precoding on the to-be-sent symbol in the foregoing precoding code block by using the foregoing constructed precoding matrix, to obtain the precoded symbol.

In still another implementation manner of this embodiment, the interference cancellation module 81 is specifically configured to: reserve at least one subcarrier between adjacent precoding code blocks as a guard band, where valid data is not transmitted on the foregoing guard band; or reserve at least one symbol between adjacent precoding code blocks as a guard band, where valid data is not transmitted on the foregoing guard band; or reserve at least one subcarrier and at least one symbol between adjacent precoding code blocks as a guard band, where valid data is not transmitted on the foregoing guard band.

In this embodiment, the foregoing signal sending device 9 may be a device that has a signal sending function, such as a base station, a relay (Relay), an access point (AP), or a UE. This embodiment imposes no limitation on a form of the signal sending device 9.

According to the foregoing signal sending device, interference between precoding code blocks of a received signal is completely or partially canceled by performing interference pre-cancellation on a sent symbol in a MIMO-FBMC system, or by designing a precoding matrix to implement that a coefficient matrix of an interference amount is a zero matrix, or by using a method for reserving a guard band around a precoding code block.

Figure 10:
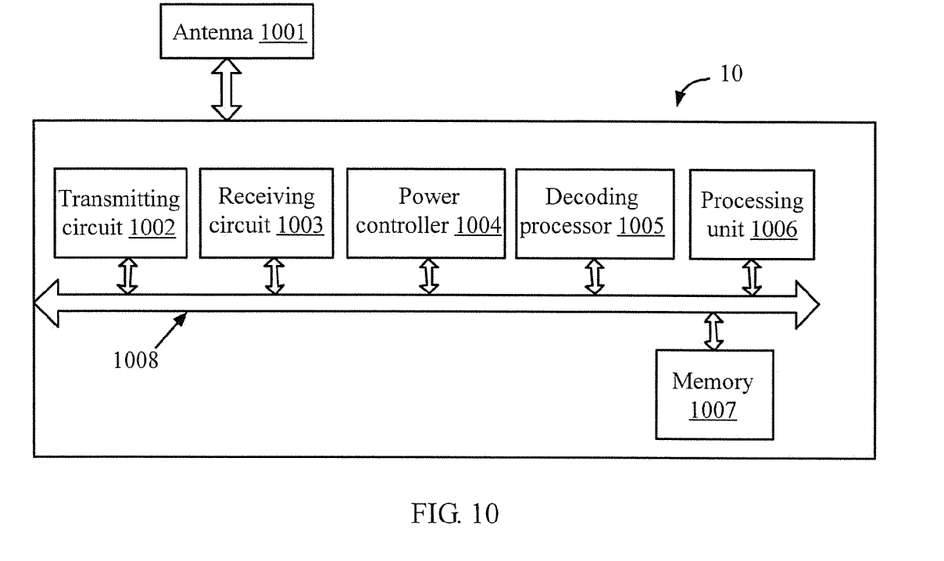
FIG. 10 is a schematic structural diagram of still another embodiment of a signal sending device according to the present invention.

FIG. 10 is a schematic structural diagram of still another embodiment of a signal sending device according to the present invention. As shown in FIG. 10, the signal sending device 10 includes a transmitting circuit 1002, a receiving circuit 1003, a power controller 1004, a decoding processor 1005, a processing unit 1006, a memory 1007, and an antenna 1001. The processing unit 1006 controls an operation of the signal sending device 10, and the processing unit 1006 may also be referred to as a central processing unit (Central Processing Unit, CPU for short). The memory 1007 may include a read-only memory and a random access memory, and provides an instruction and data for the processing unit 1006. A part of the memory 1007 may further include a nonvolatile random access memory (NVRAM). In a specific application, the signal sending device 10 may be built in or the signal sending device 10 may be a wireless communications device such as a mobile phone, and a carrier that accommodates the transmitting circuit 1002 and the receiving circuit 1003 may further be included, so as to allow the signal sending device 10 to perform data transmission and receiving. The transmitting circuit 1002 and the receiving circuit 1003 may be coupled to the antenna 1001. All components of the signal sending device 10 are coupled together by using a bus system 1008, where the bus system 1008 may include a power bus, a control bus, and a status signal bus in addition to a data bus. However, for clarity of description, various buses are marked as the bus system 1008 in FIG. 10. The signal sending device 10 may further include the processing unit 1006 configured to process a signal, and in addition, further includes the power controller 1004 and the decoding processor 1005. Specifically, in different products, the decoding processor 1005 and the processing unit 1006 may be integrated.

In this embodiment, the processing unit 1006 may implement or execute steps and logical block diagrams disclosed in the method embodiments of the present invention. The processing unit 1006 may be a microprocessor or may be any conventional processor. Steps of the methods disclosed with reference to the embodiments of the present invention may be directly executed and completed by using a hardware processor, or may be executed and completed by using a combination of hardware and software modules in a processor. The software module may be located in a mature storage medium in the field, such as a random access memory, a flash memory, a read-only memory, a programmable read-only memory, an electrically-erasable programmable memory, or a register. The storage medium is located in the memory 1007, and the processing unit 1006 reads information from the memory 1007, and works together with hardware to implement the steps disclosed in the method embodiments of the present invention.

In this embodiment, the foregoing signal sending device may be a device that has a signal sending function, such as a base station, a relay (Relay), an access point (AP), or user equipment (UE). This embodiment imposes no limitation on a form of the signal sending device.

The signal sending device in this embodiment completely or partially cancels interference between precoding code blocks of a received signal by performing interference pre-cancellation on a sent symbol in a MIMO-FBMC system, or implementing that a coefficient matrix is a zero matrix by designing a precoding matrix, or by using a method for reserving a guard band around a precoding code block.

A person skilled in the art may understand that the accompanying drawings are merely schematic diagrams of exemplary embodiments, and modules or processes in the accompanying drawings are not necessarily required for implementing the present invention.

A person skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal sending method, comprising:
   canceling interference from symbols of a boundary between at least two precoding code blocks in a multiple input multiple output filter bank multicarrier (MIMO-FBMC) system, wherein the precoding code block comprises at least one time-frequency resource element that uses same precoding;
   in response to canceling the interference from the symbols of the boundary between the at least two precoding code blocks in the MIMO-FBMC system, performing precoding on a to-be-sent symbol in at least one of the precoding code blocks to obtain a precoded symbol; and
   sending the precoded symbol.

2. The method according to claim 1, wherein:
   the symbols of the boundary between the at least two precoding code blocks are determined by a diffusion range that is of an interference coefficient table of a filter bank and in a time domain and a frequency domain, and ranges of the symbols of the boundary between the at least two precoding code blocks each are less than or equal to the diffusion range that is of the interference coefficient table and in the time domain and the frequency domain.

3. The method according to claim 1, wherein the time-frequency resource element that uses same precoding comprises a time-frequency resource element that is processed by a transmit end and has a same coefficient matrix before symbol sending.

4. The method according to claim 1, wherein canceling interference from symbols of a boundary between at least two precoding code blocks in a multiple input multiple output filter bank multicarrier (MIMO-FBMC) system comprises:
   determining an interference offset, and adding the interference offset to at least one of the symbols of the boundary between the precoding code blocks to obtain the to-be-sent symbol.

5. The method according to claim 4, wherein determining an interference offset comprises:
   determining a precoding code block on which interference exists; and
   calculating, according to an acquired channel matrix, a precoding matrix used by the precoding code block on which interference exists, an interference coefficient table of a filter bank, and a symbol that generates interference, an interference offset corresponding to the symbols of the boundary between the at least two precoding code blocks.

6. The method according to claim 1, wherein canceling interference from symbols of a boundary between at least two precoding code blocks in a multiple input multiple output filter bank multicarrier (MIMO-FBMC) system comprises:
   constructing a precoding matrix to cancel interference generated by a precoding code block that uses the constructed precoding matrix to another precoding code block.

7. The method according to claim 6, wherein constructing a precoding matrix to cancel interference generated by a precoding code block that uses the constructed precoding matrix to another precoding code block comprises:
   constructing the precoding matrix, so that for the $i^{th}$ precoding code block that does not use the constructed precoding matrix, $\text{Im}(W_i H_i P)$ is a zero matrix, wherein P is the constructed precoding matrix, W is a balanced matrix that is used by a receiver and of the $i^{th}$ precoding code block that does not use the constructed precoding matrix, $H_i$ indicates a channel matrix of the $i^{th}$ precoding code block that does not use the constructed precoding matrix, and $\text{Im}(\cdot)$ indicates performing, on $(\cdot)$, an operation of obtaining an imaginary part of a complex number.

8. The method according to claim 6, wherein performing precoding on a to-be-sent symbol in the precoding code block to obtain a precoded symbol comprises:
   performing precoding on the to-be-sent symbol in the precoding code block using the constructed precoding matrix, to obtain the precoded symbol.

9. The method according to claim 1, wherein canceling interference from symbols of a boundary between at least two precoding code blocks in a multiple input multiple output filter bank multicarrier (MIMO-FBMC) system comprises:
   reserving at least one subcarrier between adjacent precoding code blocks as a guard band, wherein valid data is not transmitted on the guard band; or
   reserving at least one symbol between adjacent precoding code blocks as a guard band, wherein valid data is not transmitted on the guard band; or
   reserving at least one subcarrier and at least one symbol between adjacent precoding code blocks as a guard band, wherein valid data is not transmitted on the guard band.

10. A signal sending device, comprising:
    a processor; and
    memory coupled to the processor, the memory comprising instructions that, when executed by the processor, cause the device to:
    cancel interference from symbols of a boundary between at least two precoding code blocks in a multiple input multiple output filter bank multicarrier (MIMO-FBMC) system, wherein the precoding code block comprises at least one time-frequency resource element that uses same precoding;

in response to cancelling the interference from the symbols of the boundary between the at least two precoding code blocks in the MIMO-FBMC system, perform precoding on a to-be-sent symbol in the precoding code block to obtain a precoded symbol; and send the obtained precoded symbol.

11. The device according to claim 10, wherein the symbols of the boundary between the at least two precoding code blocks are determined by a diffusion range that is of an interference coefficient table of a filter bank and in a time domain and a frequency domain, and ranges of the symbols of the boundary between the at least two precoding code blocks each are less than or equal to the diffusion range that is of the interference coefficient table and in the time domain and the frequency domain.

12. The device according to claim 10, wherein the time-frequency resource element that uses same precoding comprises a time-frequency resource element that is processed by a transmit end and has a same coefficient matrix before symbol sending.

13. The device according to claim 10, wherein the memory further comprises instructions that, when executed by the processor, cause the device to:
    determine an interference offset, and add the interference offset to at least one of the symbols of the boundary between the precoding code blocks to obtain the to-be-sent symbol.

14. The device according to claim 13, wherein the memory further comprises instructions that, when executed by the processor, cause the device to:
    determine a precoding code block on which interference exists; and
    calculate, according to an acquired channel matrix, a precoding matrix used by the precoding code block on which interference exists and that is determined by the determining submodule, an interference coefficient table of a filter bank, and a symbol that generates interference, an interference offset corresponding to the symbols of the boundary between the at least two precoding code blocks.

15. The device according to claim 10, wherein the memory further comprises instructions that, when executed by the processor, cause the device to:
    construct a precoding matrix to cancel interference generated by a precoding code block that uses the constructed precoding matrix to another precoding code block.

16. The device according to claim 15, wherein the memory further comprises instructions that, when executed by the processor, cause the device to:
    construct the precoding matrix, so that for the $i^{th}$ precoding code block that does not use the constructed precoding matrix, $Im(W_i H_i P)$ is a zero matrix, wherein
    P is the constructed precoding matrix, $W_i$ is a balanced matrix that is used by a receiver and of the $i^{th}$ precoding code block that does not use the constructed precoding matrix, $H_i$ indicates a channel matrix of the $i^{th}$ precoding code block that does not use the constructed precoding matrix, and $Im(\cdot)$ indicates performing, on $(\cdot)$, an operation of obtaining an imaginary part of a complex number.

17. The device according to claim 15, wherein the memory further comprises instructions that, when executed by the processor, cause the device to:
    perform precoding on the to-be-sent symbol in the precoding code block by using the constructed precoding matrix, to obtain the precoded symbol.

18. The device according to claim 10, wherein the memory further comprises instructions that, when executed by the processor, cause the device to:
    reserve at least one subcarrier between adjacent precoding code blocks as a guard band, wherein valid data is not transmitted on the guard band; or
    reserve at least one symbol between adjacent precoding code blocks as a guard band, wherein valid data is not transmitted on the guard band; or
    reserve at least one subcarrier and at least one symbol between adjacent precoding code blocks as a guard band, wherein valid data is not transmitted on the guard band.

* * * * *